United States Patent [19]

Shinozaki et al.

[11] Patent Number: 4,786,428
[45] Date of Patent: Nov. 22, 1988

[54] ELECTROLYTE FOR ELECTROLYTIC CAPACITOR

[75] Inventors: Fumihiko Shinozaki, Fussa; Yutaka Yokoyama, Saitama, both of Japan

[73] Assignee: Nippon Chemi-Con Corporation, Tokyo, Japan

[21] Appl. No.: 19,869

[22] Filed: Feb. 27, 1987

[30] Foreign Application Priority Data

Feb. 28, 1986 [JP] Japan ................................ 61-41738

[51] Int. Cl.$^4$ ............................................. H01G 9/07
[52] U.S. Cl. ..................................... 252/62.2; 361/433
[58] Field of Search ........................ 252/62.2; 361/433

[56] References Cited

U.S. PATENT DOCUMENTS 4,046,652  9/1977  Pistorius et al. .................... 204/78
4,334,972  6/1982  Söderberg ........................ 252/62.2

Primary Examiner—John F. Niebling
Assistant Examiner—Kathryn Gorgos
Attorney, Agent, or Firm—James F. Haley, Jr.

[57] ABSTRACT

An electrolyte for an electrolytic capacitor is disclosed containing a fluoro-complex acid salt of an alkylene bisamine compound as solute within an aprotic solvent. The electrolyte exhibits high conductivity while eliminating the drawbacks associated with the presence of water.

4 Claims, No Drawings

ELECTROLYTE FOR ELECTROLYTIC CAPACITOR

Hitherto, organic acids or their salts and glycol series pastes have been principally used as an electrolyte for electrolytic capacitor for general purposes. The latest expansion of utilization for the electronic instruments requires more improvement and advancement in the reliability and performance of the capacitor entailing solving the undesired problem of the presence of water in the paste, and as a result an electrolyte using an aprotic solvent in place of organic acid and its salt and glycol paste has become attractive.

The greatest subject of research of the aprotic solvent system electrolyte is how to obtain an electrolyte of high conductivity, and to achieve this, an organic carboxylic acid or its salt which is well soluble in the aprotic solvent and has a high degree of dissociation has been researched as a primary candidate but has not yet been successful. To solve the matter and obtain a high conductivity, a solvent which produces water resulting from the reaction between acids and alcohols or glycols and even water is incorporated into the aprotic solvent, yielding insufficient conductivity, increments of water and solute contents with poor reliability at the elevated temperature as disclosed in the Japanese patent publications No. 55-3989, 57-56763, 58-32769 and the U.S. Pat. No. 4,117,531.

After extensive researches and studies to obtain an electrolyte which is a substantially nonaqueous system electrolyte and has a high conductivity with use of an aprotic solvent. Any solvent which forms water in reaction between acids and alcohols with glycols is to be avoided. It has been discovered that a fluorocomplex acid salt of an alkylene bisamine compound has a high solubility in the aprotic solvent with an enhanced releasability to provide a high conductivity.

SUMMARY OF THE INVENTION

Thus, a principal object of the invention is to provide an electrolyte of substantially non water series high conductivity with use of the aprotic solvent.

An electrolyte for electrolytic capacitor according to the invention is characterized by containing a fluorocomplex acid salt of an alkylene bisamine compound in the aprotic solvent as solute.

PREFERRED EMBODIMENTS OF THE INVENTION

The alkylene bisamine compounds according to the invention is preferably selected from the compound of general formula

in which $R_1$ is a linear or branched alkylene group of the formula $C_nH_{2n}$ in which n is a integer from 2 to 6, and each $R_2$ is independently selected from hydrogen, alkyl groups having 1 to 8 carbon atoms and alkenyl groups having 1 to 8 carbon atoms, $R_3$ or $R_4$ is absent or is hydrogen or is the same as $R_2$.

The alkylene group forming the alkylene bisamine compound may be selected from ethylene group, propylene group

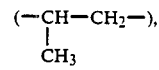

trimethylene group, tetramethylene group, pentamethylene group, hexamethylene group and the like. The bisamine compound is formed by the bonding of the alkylene group with the amine groups, in which said amine groups consist of primary amine group ($-NH_2$), secondary amine group ($-NHR$), tertiary amine group ($-N(R)_2$) or quaternary ammonium ($-N^+(R)_3$), in which R of lower alkyl group or lower alkenyl group, and R consists of $(R)_2$ or $(R)_3$ may consist preferably of the same group respectively in the points of industrial use and cost, but may consist of different alkyl group or alkenyl group respectively for the solute of the electrolytic capacitor according to the present invention.

The alkylene bisamine compound to be preferably used in the invention may be selected from the following but not limited thereto:

ethylenediamine [$NH_2(CH_2)_2NH_2$]
hexamethylenediamine [$NH_2(CH_2)_6NH_2$]
propylene.bis(methylamine)

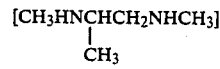

trimethylene.bis(di-t-buthylamine)
[$[(CH_3)_3C]N(CH_2)_3N[C(CH_3)_3]$]
tetramethylene.bis(diallylamine)
[$(CH_2=CHCH_2)_2N(CH_2)_4N(CH_2CH=CH_2)_2$]
hexamethylene.bis(trimethylammonium
[$(CH_3)_3N(CH_2)_6N(CH_3)_3$]$^{2+}$ The fluorocomplex acid to be used in the invention may be tetrafluoroboric acid ($HBF_4$) or hexafluorophosphoric acid ($HPF_6$).

The aprotic solvent to be used in the invention may be selected from the following but not limited thereto:

(1) Amide system solvent:
N-methylformamide, N,N-dimethylformamide, N-ethylformamide, N,N-diethylformamide, N-methylacetamide, N,N-dimethylacetamide, N-ethylacetamide, N,N-diethylacetamide, hexamethylphosphorinamide (2) Oxide compounds:
dimethyl sulfoxide (3) Nitrile compounds:
acetonitrile (4) Cyclic esters, cyclic amides:
γ-butyrolactone, N-methyl-2-pyrrolidone, ethylene carbonate, propylene carbonate.

An electrolyte for electrolytic capacitor according to the invention may conveniently be prepared by adding to an aqueous solution of fluorocomplex acid salt of at least one equivalent amount, preferably two equivalent amounts of alkylene bisamine compounds for reaction with subsequent vacuum drying to obtain an anhydrous salt to which, for example, an approximately 10% by weight solution is then added to the aprotic solvent to prepare the resultant electrolyte. The use of a 10% by weight solution is preferred.

(EXAMPLES 1 TO 13)

An electrolyte for electrolytic capacitor according to the invention will be exemplified in the following with 10% by weight solution for fluorocomplex acid salt of various alkylene bisamine compounds with respect to the conductivity as shown in Table 1.

Further, as comparative example the conventional standard electrolytes composed of 78% by weight of ethylene glycol, 12% by weight of water and 10% by weight of ammonium adipate are shown also in Table 1.

TABLE 1

| Example | Fluorocomplex acid salt of alkylene bisamine compound | Aprotic Solvent | Conductivity (ms/cm) |
|---|---|---|---|
| 1 | ethylenediamine ditetrafluoroborate | N—methyl-2-pyrrolidone | 7.8 |
| 2 | ethylene.bis(methylamine) ditetrafluoroborate | γ-butyrolactone | 12.7 |
| 3 | ethylene.bis(dimethylamine) ditetrafluoroborate | N,N—dimethylformamide | 19.3 |
| 4 | tetramethylene.bis(diallylamine) ditetrafluoroborate | acetonitrile | 24.0 |
| 5 | ethylenediamine dihexafluorophosphate | N—methyl-pyrrolidone | 7.1 |
| 6 | ethylene.bis(methylamine) dihexafluorophosphate | γ-butyrolactone | 10.2 |
| 7 | ethylene.bis(dimethylamine) dihexafluorophosphate | N,N—dimethylformamide | 15.6 |
| 8 | tetramethylene.bis(diallylamine) dihexafluorophosphate | acetonitrile | 19.3 |
| 9 | propylene.bis(methylamine) ditetrafluoroborate | N—methyl-formamide | 12.2 |
| 10 | propylene.bis(methylamine) monotetrafluoroborate | N—methyl-formamide | 14.0 |
| 11 | trimethylene.bis(di-t-butylamine) ditetrafluoroborate | N—methyl-formamide | 11.5 |
| 12 | hexamethylenediamine tetrafluoroborate | dimethyl sulfoxide | 8.7 |
| 13 | hexamethylene.bis(trimethylammonium) diborontetrafluoride $[(CH_3)_3N(CH_2)_6N(CH_3)_3]^{2+}$ $2BF_4^-$ | dimethyl sulfoxide | 9.1 |
| Ref. | ethylene glycol 78% by weight<br>water 12% by weight<br>ammonium adipate 10% by weight | | 6.7 |

The high-temperature load test obtained at 16 V 180 micro F for electrolytes exemplified in examples 1 to 13 and comparative example are shown in Table 2.

TABLE 2

| | Initial Value | | | 110 deg. C. 1000 hours | | |
|---|---|---|---|---|---|---|
| Example | Capacity μF | tan δ | Leakage Current μA | Capacity μF | tan δ | Leakage Current μA |
| 1 | 178 | 0.078 | 0.53 | 169 | 0.094 | 0.51 |
| 2 | 179 | 0.064 | 0.61 | 174 | 0.070 | 0.58 |
| 3 | 183 | 0.046 | 0.64 | 170 | 0.060 | 0.60 |
| 4 | 184 | 0.033 | 0.56 | 166 | 0.049 | 0.53 |
| 5 | 177 | 0.080 | 0.55 | 168 | 0.104 | 0.52 |
| 6 | 178 | 0.072 | 0.61 | 173 | 0.079 | 0.56 |
| 7 | 180 | 0.057 | 0.58 | 167 | 0.080 | 0.55 |
| 8 | 180 | 0.047 | 0.62 | 162 | 0.071 | 0.59 |
| 9 | 179 | 0.065 | 0.57 | 175 | 0.072 | 0.54 |
| 10 | 180 | 0.061 | 0.60 | 176 | 0.067 | 0.52 |
| 11 | 179 | 0.068 | 0.54 | 171 | 0.073 | 0.50 |
| 12 | 177 | 0.076 | 0.59 | 172 | 0.091 | 0.56 |
| 13 | 177 | 0.075 | 0.55 | 169 | 0.090 | 0.51 |
| Ref. | 176 | 0.085 | 0.72 | 150 | 0.128 | 0.71 |

The electrolyte according to the invention may provide a non water series electrolyte having a high conductivity equivalent to or more than the conductivity of the conventional electrolyte composed of glycols, water and organic acid salt with improved and wide applicability in design of electrolytic capacitor.

What is claimed is:

1. An electrolyte for electrolytic capacitors comprising an aprotic solvent and a fluorocomplex acid salt of an alkylene bisamine compound of general formula

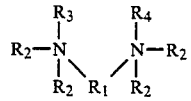

in which $R_1$ is a linear or branched alkylene group of the formula $C_nH_{2n}$ in which n is an integer from 2 to 6, and each $R_2$ is independently selected from hydrogen, alkyl groups having 1 to 8 carbon atoms and alkenyl groups having 1 to 8 carbon atoms, $R_3$ or $R_4$ is absent or is hydrogen or is the same as $R_2$.

2. An electrolyte for electrolytic capacitor according to claim 1, wherein aprotic solvent is selected from the group of N-methylformamide, N,N-dimethylformamide, N-ethylformamide, N,N-diethylformamide, N-methylacetamide, N,N-dimethylacetamide, N-ethylacetamide, N,N-diethylacetamide, γ-butyrolactone, N-methyl-2-pyrrolidone, ethylene carbonate, propylene carbonate, dimethyl sulfoxide, acetonitrile or the mixture thereof.

3. An electrolyte for electrolytic capacitor according to claim 1, wherein the fluorocomplex acid is tetrafluoroboric acid or hexafluorophosphoric acid.

4. An electrolyte for electrolytic capacitor according to claim 2, wherein the fluorocomplex acid is tetrafluoroboric acid or hexafluorophosphoric acid.

* * * * *